(12) United States Patent
Blond

(10) Patent No.: US 10,499,760 B2
(45) Date of Patent: Dec. 10, 2019

(54) ELECTRIC APPLIANCE FOR HEATING AND/OR COOKING FOOD WITH STEAM

(71) Applicant: SEB S.A., Ecully (FR)

(72) Inventor: Laurent Blond, Beaune (FR)

(73) Assignee: SEB S. A. (FR)

( * ) Notice: Subject to any disclaimer, the term of this patent is extended or adjusted under 35 U.S.C. 154(b) by 665 days.

(21) Appl. No.: 15/104,044

(22) PCT Filed: Dec. 10, 2014

(86) PCT No.: PCT/FR2014/053252
§ 371 (c)(1),
(2) Date: Jun. 13, 2016

(87) PCT Pub. No.: WO2015/086990
PCT Pub. Date: Jun. 18, 2015

(65) Prior Publication Data
US 2017/0143152 A1     May 25, 2017

(30) Foreign Application Priority Data

Dec. 13, 2013   (FR) ..................... 13 62545

(51) Int. Cl.
| | |
|---|---|
| A47J 27/00 | (2006.01) |
| A47J 37/00 | (2006.01) |
| A47J 27/04 | (2006.01) |
| A47J 37/06 | (2006.01) |
| A47J 27/58 | (2006.01) |

(52) U.S. Cl.
CPC ............ *A47J 27/04* (2013.01); *A47J 27/002* (2013.01); *A47J 27/004* (2013.01); *A47J 27/58* (2013.01); *A47J 37/0611* (2013.01); *A47J 2027/043* (2013.01)

(58) Field of Classification Search
CPC ... A47J 27/04; A47J 2027/043; A47J 37/0611
USPC ......... 99/417, 410, 467, 474, 473, 349, 377; 126/20, 369; 219/401
See application file for complete search history.

(56) References Cited

U.S. PATENT DOCUMENTS

| | | | | |
|---|---|---|---|---|
| 3,320,945 | A * | 5/1967 | Dunkelman | A47J 27/04 122/208 |
| 5,092,229 | A * | 3/1992 | Chen | A47J 27/0811 126/348 |
| 6,320,612 | B1 * | 11/2001 | Young | B60R 1/00 348/148 |
| 7,846,332 | B1 * | 12/2010 | Back | C02F 1/44 210/261 |

FOREIGN PATENT DOCUMENTS

| | | |
|---|---|---|
| CA | 1199191 A | 1/1986 |
| EP | 1651084 B1 | 7/2004 |
| WO | 2004/037055 A1 | 5/2004 |

* cited by examiner

*Primary Examiner* — Reginald Alexander
(74) *Attorney, Agent, or Firm* — The Webb Law Firm

(57) ABSTRACT

Provided is a food cooking and/or heating appliance including an enclosure (2) including a reservoir (40) and a cover (20), and a steam production device. The cover (20) is equipped with a steam expansion chamber (3) supplied with steam by the steam production device (1). The steam expansion chamber (3) includes a containment wall (4) delimiting part of the enclosure (2) and the containment wall (4) can move in relation to the reservoir (40) when the cover (20) closes the enclosure (2).

19 Claims, 6 Drawing Sheets

ELECTRIC APPLIANCE FOR HEATING AND/OR COOKING FOOD WITH STEAM

CROSS-REFERENCE TO RELATED APPLICATIONS

This application is the United States national phase of International Application No. PCT/FR2014/053252 filed Dec. 10, 2014, and claims priority to French Patent Application No. 1362545 filed Dec. 13, 2013, the disclosures of which are hereby incorporated in their entirety by reference.

FIELD OF THE INVENTION

This invention pertains to the technical field of appliances for cooking and/or heating food with steam.

More particularly, this invention pertains to appliances in which contact between the food and the steam is limited or avoided.

DESCRIPTION OF RELATED ART

Known art is patent document EP 1 651 084, an appliance for cooking and/or heating food, consisting of an enclosure comprising a container, lid and a steam generating device. The lid is rotatably mounted on the container. Such an appliance is simple to use. However, the steam produced by the steam generating device is injected into the enclosure. This arrangement has the disadvantage of watering down the food during cooking, resulting in a loss of nutrients.

One purpose of this invention is to provide an appliance for cooking and/or heating food with steam that helps preserve vitamins and minerals, as well as the flavor of the food.

Another purpose of this invention is to provide an appliance for cooking and/or heating food using steam, which is simple to use.

Another purpose of this invention is to provide an appliance for cooking and/or heating food using steam, which cooks and/or heats the food quickly.

Another purpose of this invention is to provide an appliance for cooking and/or heating food using steam, which can be used to prepare sauces and/or sauce dishes.

Another purpose of this invention is to provide an appliance for cooking and/or heating food using steam, which facilitates the production of a series of several dishes.

Another purpose of this invention is to provide an appliance for cooking and/or heating food using steam, in which the crushing of the food is limited or prevented.

SUMMARY OF THE INVENTION

These purposes are fulfilled with an appliance for cooking and/or heating food consisting of an enclosure comprising a container, lid and a steam generating device, due to the fact that the lid incorporates a steam expansion chamber that receives steam from the steam generating device, that the steam expansion chamber comprises a containment wall to delimit one portion of the enclosure, and that the containment wall is mobile with respect to the container when the enclosure is closed with the lid. The mobile containment wall in contact with the steam in the steam expansion chamber may come into contact with food and heat food by conduction. Steam cooking or heating are thus possible. The reduction in the enclosure volume to accommodate the steam expansion chamber enables faster heating and/or cooking of food than possible with a standard-sized enclosure. Sauces and/or sauce dishes may be prepared more easily. The watering down of food by steam can be prevented. The appliance is simple to use and does not require the use of any consumables such as disposable cooking pouches, or any kind of cooking pouch or reusable cooking pouch.

In one advantageous embodiment, the containment wall is at least partially made of a flexible, elastically deformable material.

This arrangement makes it possible to easily adjust the volume of the enclosure to fit the food present in the container. This arrangement also helps to improve thermal exchange between the steam and the food. In one alternative variant, the containment wall could, in particular, include at least one rigid component connected to the cover by way of a flexible component such as ring-shaped bellows encircling said rigid component.

Thus, advantageously, the containment wall offers a resting position that is at least partially set inside the lid. This arrangement makes it possible to increase the volume of the enclosure while maintaining a compact design.

In one advantageous embodiment, the container is equipped with a removable slotted rack with a juice collection area underneath the perforations of the slotted rack. This arrangement makes it possible to collect cooking juices that drain out of the food.

Also advantageously, the cover incorporates an airtight ring supported by an upper rim of the container. This arrangement limits heat loss outside of the enclosure with a simple design.

Alternatively, an airtight ring may be formed or fitted on the container.

Also advantageously, the container is contained by a main body. This arrangement simplifies the construction of the appliance.

Thus, advantageously, the container can be removed from the main body. This arrangement simplifies the use of the appliance.

Also advantageously, the lid is mounted so as to be mobile with respect to the main body between a raised position for the introduction of food into the container or the removal of food from the container, and a lowered position for the cooking and/or heating of food placed inside the container. This arrangement simplifies both the construction and the use of the appliance.

Also advantageously, the steam generating device is contained within the main body. This arrangement facilitates the handling of the lid. This arrangement also simplifies the construction of the appliance.

In one embodiment, the steam generating device comprises a water tank associated with a heating element. Such a construction is particularly economical. Advantageously, the heating element is thus surrounded by a ring-shaped component at the bottom of the water tank. This arrangement simplifies the construction of the appliance. Alternatively, the steam generating device may consist of a steam generator supplied with water from a water tank by a pump.

Thus, advantageously, the bottom of the container thus presents a raised component extending above the heating element. This arrangement makes it possible to collect liquid food, in particular cooking juices, in an area of the container that is not directly exposed to heat from the flow of steam from the steam generating device.

Also advantageously, the slotted rack has a non-slotted portion positioned above the heating element. This arrangement makes it possible to prevent the spilling of liquid into the area of the container directly exposed to heat from the flow of steam from the steam generating device.

Also advantageously, the enclosure comprises at least one inlet opening leading from the steam generating device for injecting steam into the enclosure. This arrangement makes it possible to obtain a quicker temperature increase of the food present inside the enclosure, by injecting steam into the enclosure at the start of the heating and/or cooking of the food, to saturate it in steam.

Thus, advantageously, the one or more inlet opening(s) are arranged in the container. This arrangement makes it possible to obtain a particularly simple construction.

Also advantageously, the containment wall moved by the steam present inside the steam expansion chamber may occupy at least one position blocking the one or more inlet opening(s). This arrangement makes it possible to inject steam into the enclosure for a limited period of time, while maintaining the simple construction of the appliance.

Also advantageously, the enclosure comprises at least one outlet opening leading to the exterior of the appliance. This arrangement makes it possible, in particular, to evacuate the air present inside the enclosure when the steam is let into the enclosure. The evacuation of the air inside the enclosure also helps to accelerate the heating and/or cooking of the food inside the enclosure. The evacuation of the air, and therefore of oxygen, out of the enclosure also helps to limit the oxidation of delicate nutrients.

Thus, advantageously, the one or more outlet openings are located in the airtight ring. This arrangement makes it possible to achieve a particularly simple construction.

Also advantageously, the containment wall moved by the steam present inside the steam expansion chamber can occupy at least one position blocking the one or more outlet opening(s). Thus, the containment of the enclosure containing the food can be obtained simply by filling the steam expansion chamber, after the air has been evacuated. This arrangement simplifies the construction of the appliance.

Also advantageously, the appliance comprises a control means for operating the steam production of the steam generating device according to the steam pressure inside the steam expansion chamber. This arrangement makes it possible to limit any crushing of the food.

BRIEF DESCRIPTION OF THE DRAWINGS

The invention will be easier to understand upon review of one non-limiting example of implementation illustrated in the attached FIGS. 1 through 11, in which.

DETAILED DESCRIPTION OF THE INVENTION

Figure 1:
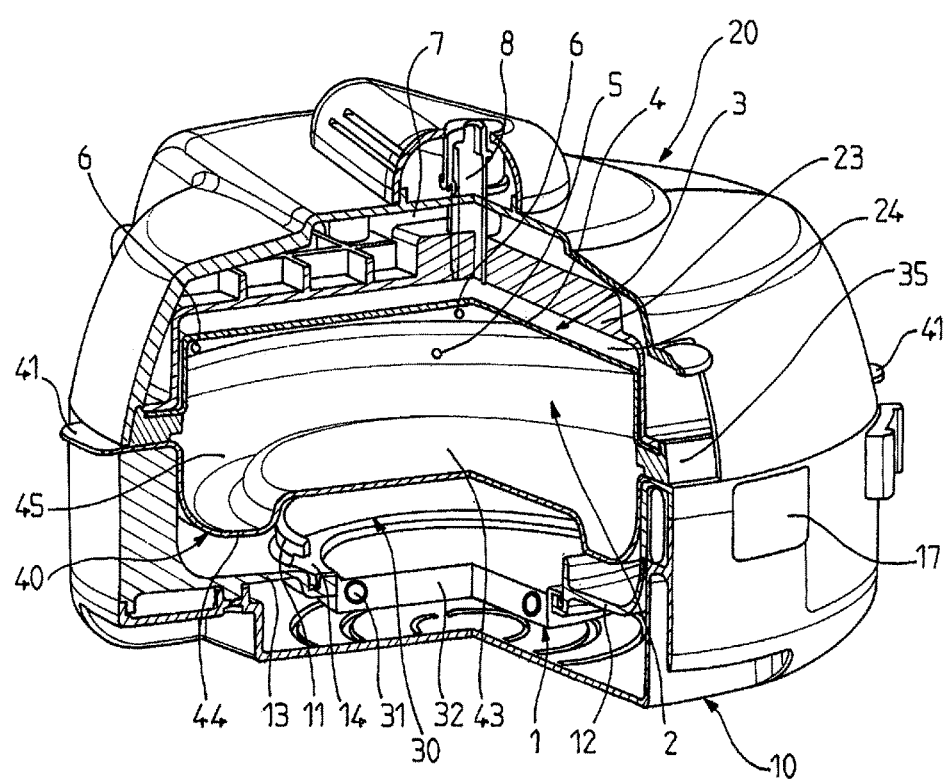
FIG. 1 is a partial cross-section perspective view of one example of implementing an appliance for cooking and/or heating food as described in the invention, in which the enclosure for receiving the food to be cooked and/or heated is in the closed configuration.

The appliance for cooking and/or heating food illustrated in FIG. 1 comprises a steam generating device (1) and an enclosure (2) for receiving the food to be cooked and/or heated.

Figure 4:
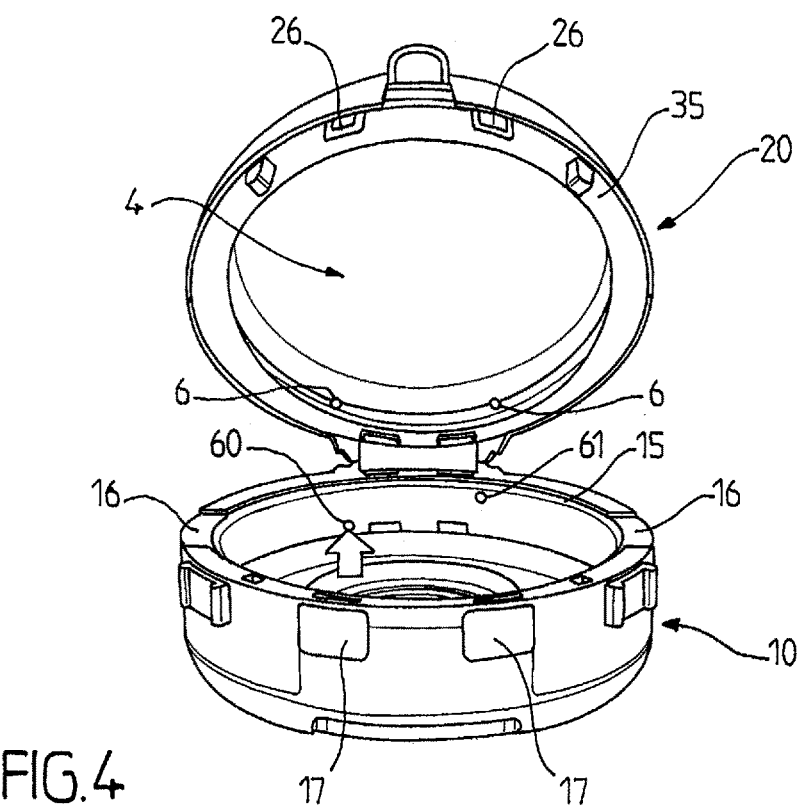
FIG. 4 is a front perspective view of the appliance illustrated in FIG. 1, in which the enclosure for receiving the food to be cooked and/or heated is in the open configuration, the container illustrated in FIGS. 2 and 3 having been removed.
Figure 5:
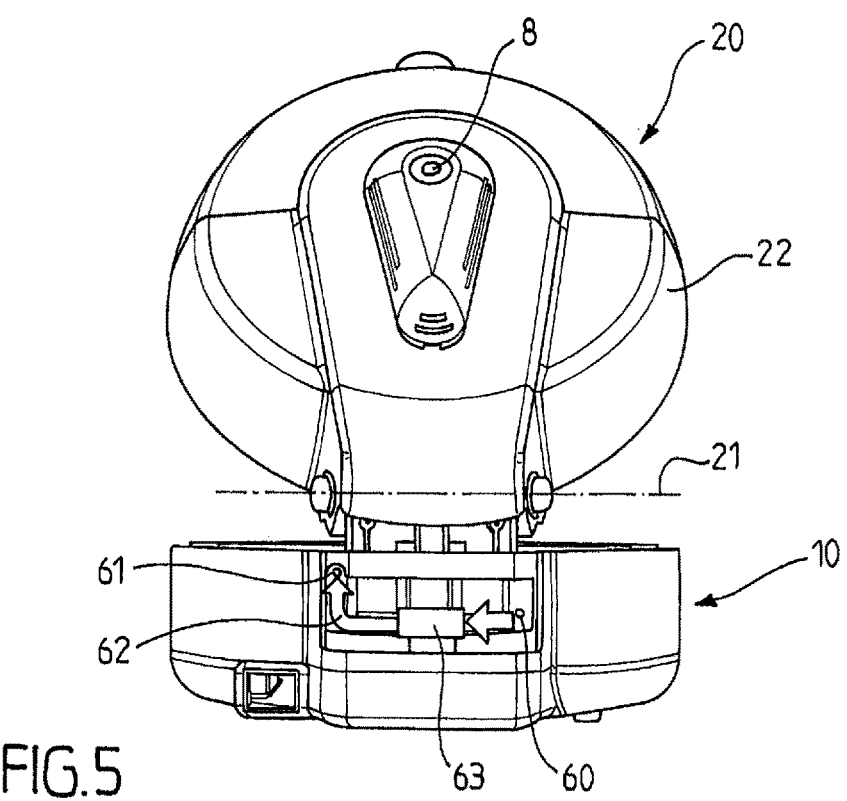
FIG. 5 is a back perspective view of the appliance illustrated in FIG. 4, in which one component of the casing has been removed to show one portion of the steam circulation.
Figure 6:
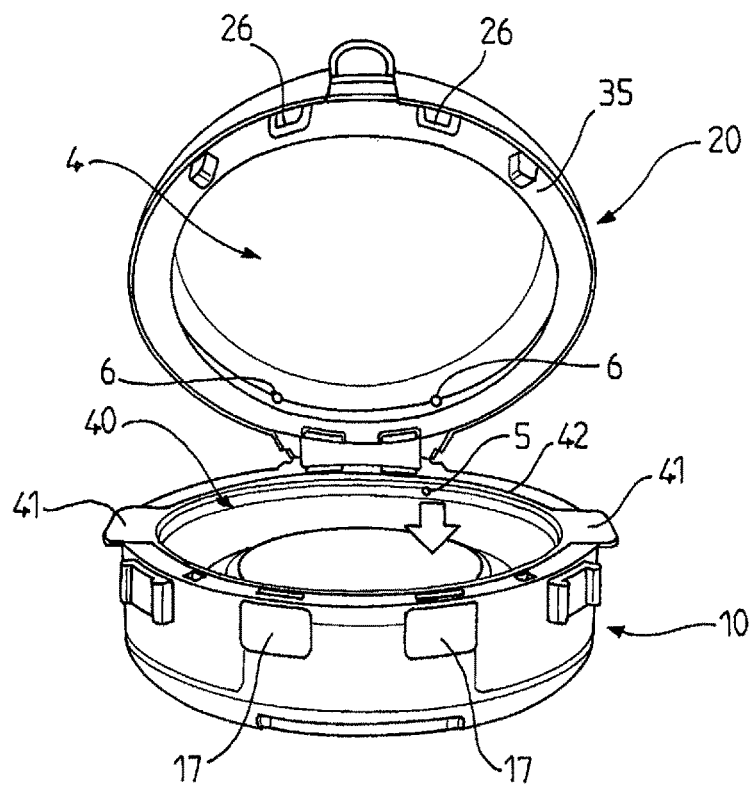
FIG. 6 is a front perspective view of the appliance illustrated in FIG. 4, in which the container illustrated in FIGS. 2 and 3 is in place, showing the injection of steam into the enclosure.

The enclosure (2) may be in a closed configuration, for cooking and/or heating the food, depicted in FIG. 1, and an open configuration, depicted in FIGS. 4, 5 and 6, in which the food can be placed inside or removed.

In the example of implementation illustrated in the figures, the enclosure (2) is formed between a container (40) and a lid (20). The container (40) is designed to receive the food to be cooked and/or heated. Preferably, the container (40) is removable, so that it can be used as a serving piece at the dining table.

In the example of implementation illustrated in the figures, the lid (20) is assembled in a mobile manner on a main body (10). The lid (20) is assembled, for example, in a pivoting manner on the main body (10) along a roughly horizontal axis (21), as depicted in FIG. 5.

The steam generating device (1) comprises a water tank (30) combined with a heating element (31).

In the example of implementation illustrated in the figures, the steam generating device (1) is arranged beneath the enclosure (2). The steam generating device (1) is arranged in the main body (10). The water tank (30) is delimited by an annular rib (11) arranged on a bottom (12) of an internal tub (13) of the main body (10). The heating element (31) is built into a heating plate (32). The heating element (31) and the heating plate (32) may be part of a heating bottom used in kettles. The heating element (31) may have, for example, 2000 W of power. The heating plate (32) is surrounded by the annular rib (11). An annular seal (14) is interposed between the heating plate (32) and the annular rib (11). The heating plate (32) thus forms the greater part of the bottom of the water tank (30).

Figure 2:
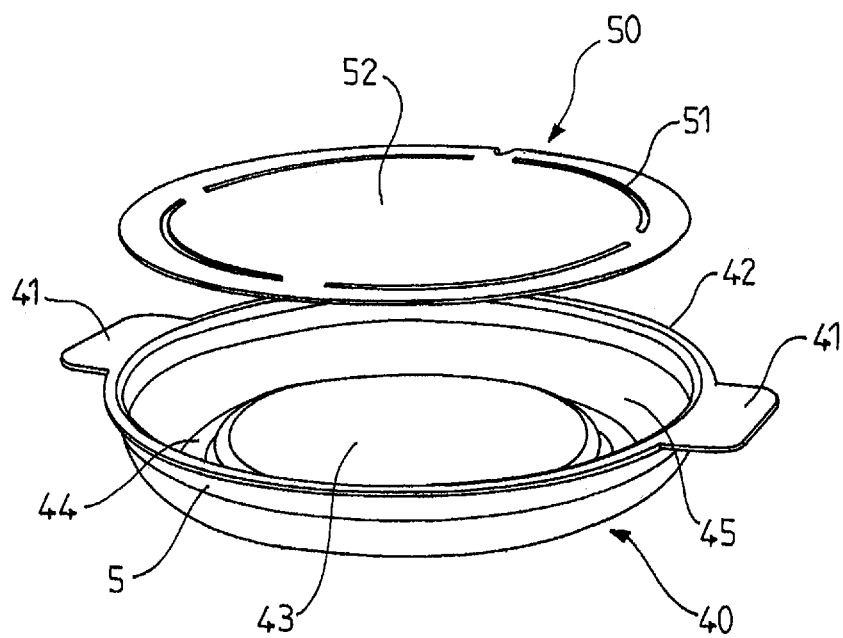
FIG. 2 is a perspective view of a slotted rack used with a container attached to the appliance illustrated in FIG. 1.

As depicted in FIG. 2, the container (40) comprises two handles (41) arranged opposite one another. The handles (41) stem from an upper edge (42) of the container (40). As shown in FIG. 6, the handles (41) extend to the exterior of the appliance. The handles (41) extend between the main body (10) and the lid (20). This arrangement makes it easier to obtain cool handles. As an alternative or complement, the container (40) and/or the handles (41) may be made of a material that does not conduct heat well, such as plastic or stainless steel.

Figure 3:
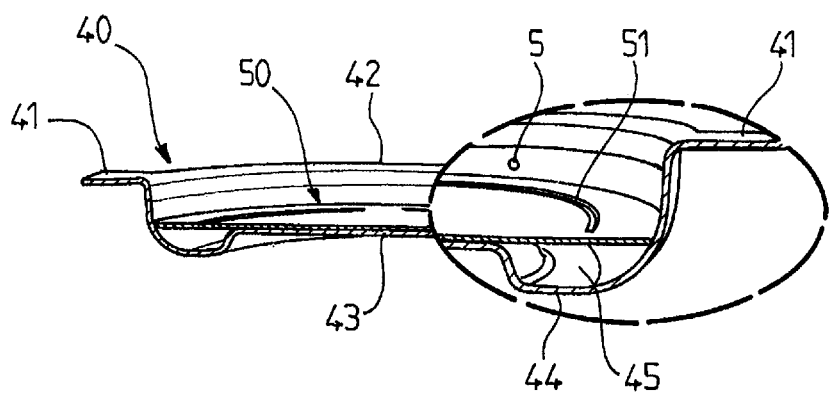
FIG. 3 is a cross-section perspective view of the slotted rack and of the container illustrated in FIG. 2, with one portion enlarged.

Preferably, the container (40) comprises at least one juice collection area (45). As shown in FIGS. 2 and 3, the bottom of the container (40) has a raised part (43). A peripheral annular groove (44) surrounds the raised part (43) of the bottom of the container (40) and forms the juice collection area (45).

As depicted in FIG. 1, the container (40) is adjusted inside the main body (10). The upper edge (42) of the container (40) rests on an internal lip (15) of the main body (10), which is better seen in FIG. 4. Thus, the space between the container (40) and the main body (10) remains contained. The internal lip (15) of the main body (10) is extended by notches (16) designed for the handles (41) of the container (40) to pass through.

FIG. 2 also shows a slotted rack (50) designed to be used with the container (40). As depicted in FIG. 3, the container (40) holds the removable slotted rack (50). The juice collection area (45) is arranged beneath a slotted part (51) of the slotted rack (50).

The slotted rack (50) rests on the raised part (43) of the container (40) and extends above the peripheral annular groove (44). The slotted rack (50) comprises a slotted part (51) arranged above the peripheral annular groove (44) forming the juice collection area (45). The slotted rack (50) comprises a non-slotted part (52) arranged above the raised part (43) of the bottom of the container (40). Thus, the juice collection area (45) is annular and extends around the raised part (43) of the bottom of the container (40) exposed to the flow of steam from the steam generating device (1).

As shown in FIG. 1, the container (40) is held by the main body (10). The container (40) is assembled in a removable manner with respect to the main body (10). The raised part (43) of the bottom of the container (40) extends above the heating element (31). Thus, the non-slotted part (52) of the slotted rack (50) is arranged above the heating element (31) and the water tank (30).

In the example of implementation illustrated in the figures, the lid (20) is assembled in a manner with respect to the main body (10) in which it is mobile between a raised position in order to place the food inside the container (40) and/or remove food from the container (40), illustrated in FIGS. 4, 5 and 6, and a lowered position in order to cook and/or heat the food placed inside the container (40), illustrated in FIG. 1. To this end, the main body (10) comprises at least one unlocking mechanism (17) combined with a latching mechanism (not depicted in the figures) designed to interact with a locking mechanism (26) that is part of the lid (20).

The appliance for cooking and/or heating food comprises a steam expansion chamber (3) supplied with steam by the steam generating device (1). The steam expansion chamber (3) is adjacent to the enclosure (2).

In the example of implementation illustrated in the figures, the steam expansion chamber (3) is arranged above the enclosure (2). More particularly, the steam expansion chamber (3) is arranged in the lid (20). In other words, the lid (20) holds the steam expansion chamber (3).

The steam expansion chamber (3) comprises a containment wall (4) partially delimiting the enclosure (2). The containment wall (4) is deformable and/or mobile.

Moreover, in the example of implementation illustrated in the figures, the enclosure (2) is partially delimited by the removable container (40).

In the example of implementation illustrated in the figures, the lid (20) comprises an exterior shell (22) advantageously connected to the main body (10), as well as a lower shell (23) housing a cavity (24) with a lower opening. The containment wall (4) is held by the lid (20). The containment wall (4) is arranged beneath the lower shell (23) and thus delimits, with the lower shell (23), the steam expansion chamber (3). The containment wall (4) is arranged above the container (40). The lid (20) holds an airtight ring (35) that is supported on an upper edge (42) of the container (40). Thus, the airtight ring (35) is part of a portion of the enclosure (2) that is mobile with respect to the container (40). The edge of the containment wall (4) is inserted between the airtight ring (35) and the lid (20). The enclosure (2) is thus delimited by the container (40), the airtight ring (35) and the containment wall (4). The containment wall (4) is mobile with respect to the container (40) when the lid closes the enclosure (2).

In one preferred method of implementation illustrated in the figures, the containment wall (4) is in the form of a sheet of elastically deformable, flexible material. The containment wall (4) is advantageously made of FEP (fluorinated ethylene propylene copolymer or tetrafluoroethylene perfluoro propylene), this material offering the advantage of being less prone to absorbing food odors than silicones.

As shown in FIG. 1, the containment wall (4) has a resting position that is at least partially sunken inside the lid (20). Thus the containment wall (4) has a resting position that is at least partially concave with respect to the enclosure (2).

Figure 10:
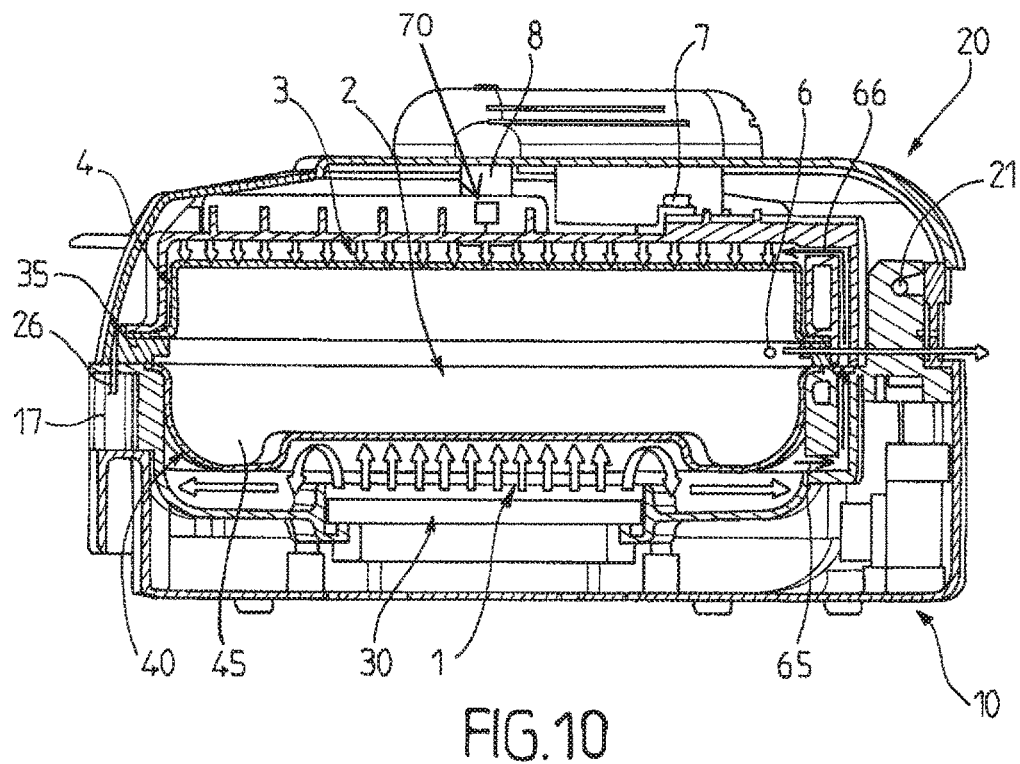
FIG. 10 is a cross-section elevation view of the appliance illustrated in FIG. 1, showing a containment wall of the appliance in the resting configuration.
Figure 11:
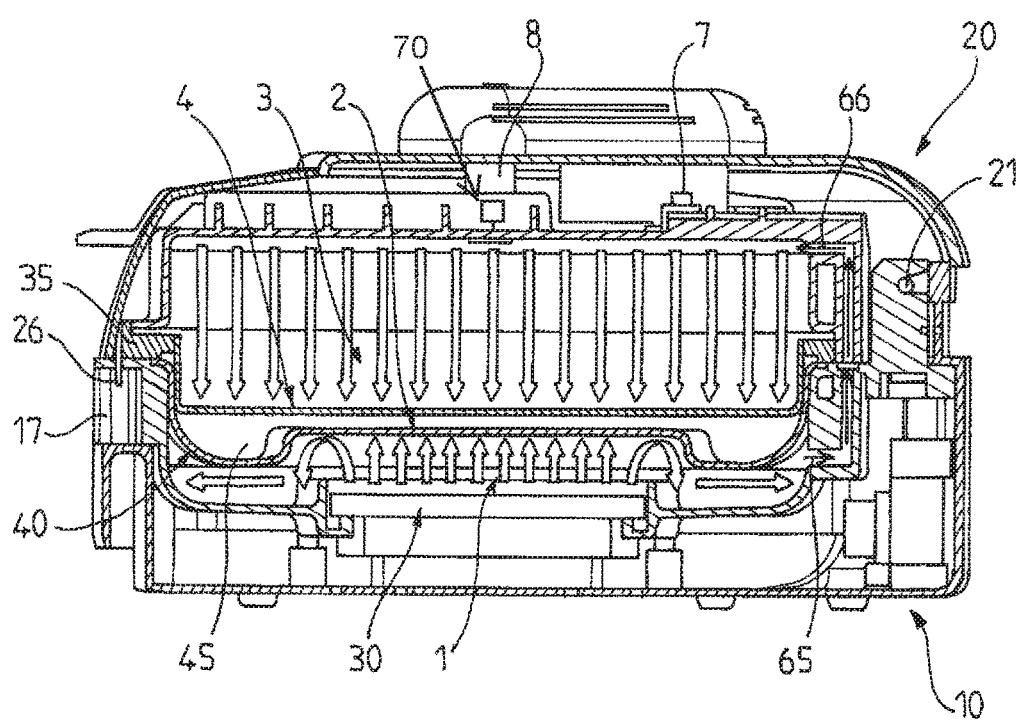
FIG. 11 is a cross-section elevation view of the appliance illustrated in FIG. 1, showing the containment wall of the appliance in the working configuration under the effect of the steam.

In the example of implementation illustrated in the figures, the steam expansion chamber (3) is supplied with steam from the steam generating device (1) by at least a first conduit (65) arranged inside the main body (10), connecting a lower part of the main body (10) below the container (40) to an upper portion of the main body (10) on the exterior of the interior lip (15) of the main body (10) holding the container (40), said first conduit (65) being connected to a second conduit (66) arranged in the lid (20), connecting a lower part of the lid (20) to the exterior of the containment wall (4) to an internal surface of the lid (20) to the interior of the containment wall (4), as shown in FIGS. 10 and 11.

Figure 7:
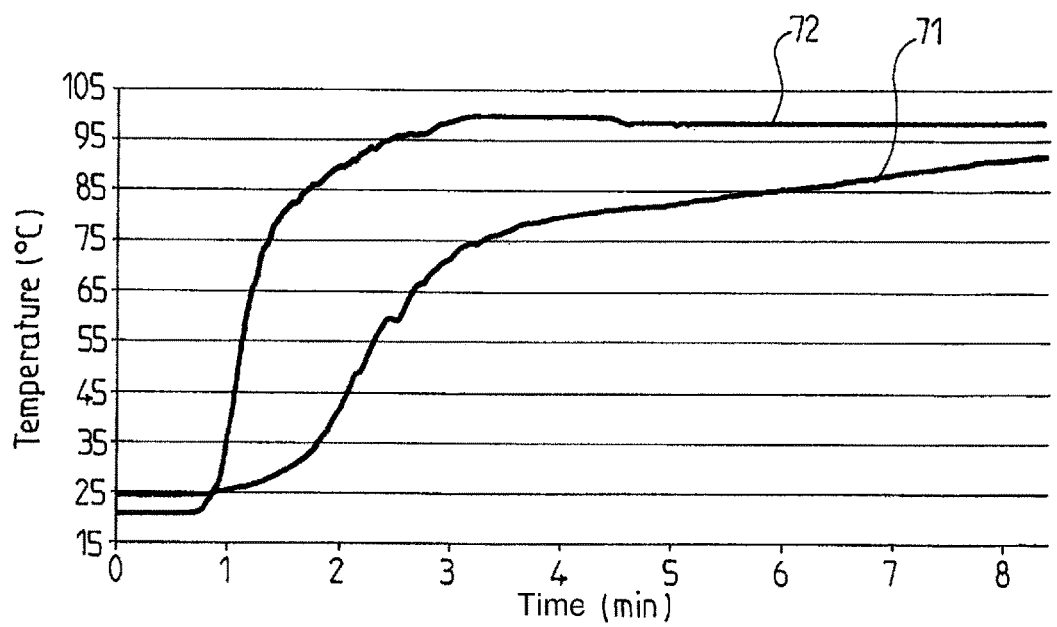
FIG. 7 is a comparative graph showing the temperature increase inside the enclosure, with steam injection and without steam injection.

In one preferred method of implementation, the enclosure (2) comprises at least one inlet opening (5) leading from the steam generating device (1) to inject steam into the enclosure (2). Tests illustrated in FIG. 7 show that the temperature increase inside the enclosure (2) is quicker when steam is let into the enclosure (2), than when no steam is let into the enclosure (2) (to reach 100° C., 3 minutes as compared to 8 minutes). The curve labeled 71 shows the temperature change inside the enclosure (2) without steam. The curve labeled 72 shows a change inside the enclosure (2) when steam is let into the enclosure (2).

In the example of implementation illustrated in the figures, the one or more inlet opening(s) (5) are arranged in the container (40). As illustrated in FIG. 3, an inlet opening (5) is arranged above the slotted rack (50). As shown in FIGS. 4 and 5, the main body (10) has a lower lateral opening (60) arranged beneath the container (40) and an upper lateral opening (61) arranged facing the inlet opening (5) arranged in the container (40). The lower lateral opening (60) is connected to the upper lateral opening (61) by a transfer conduit (62) arranged in the internal wall of the main body (10), as depicted schematically in FIG. 5.

In order to prevent the food from being watered down by the steam, the one or more inlet opening(s) (5) may be blocked by the containment wall (4) when the steam expansion chamber (3) is supplied with steam by the steam generating device (1). Thus, the containment wall (4) moved by the steam inside the steam expansion chamber (3) can occupy at least one position blocking the one or more inlet opening(s) (5).

As a variation, the transfer conduit (62) may comprise a solenoid valve (63) to control the inlet of steam inside the enclosure (2) independently of the inlet of steam into the steam expansion chamber (3), as depicted in FIG. 5.

Figure 9:
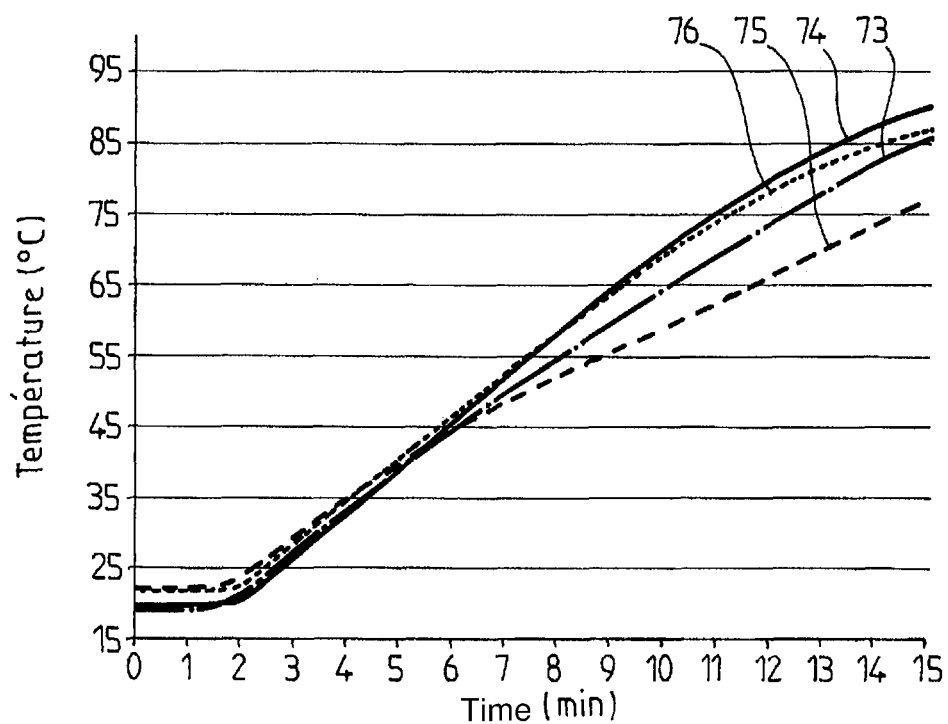
FIG. 9 is a comparative graph showing the temperature increase inside the enclosure, with air evacuation and without air evacuation.

In one preferred method of implementation, the enclosure (2) comprises at least one outlet opening (6) leading to the exterior of the appliance. Tests illustrated in FIG. 9 show that the temperature increase of the food is quicker if the air is evacuated from the enclosure (2). The curves labeled 73 and 74 show the temperature change in a food when the air is evacuated from the enclosure (2). The curves labeled 75 and 76 show the temperature change in a food when the air is not evacuated from the enclosure (2).

In order to prevent heat loss after the air has been pushed out of the enclosure (2), the one or more outlet opening(s) (6) can be blocked by the containment wall (4) when the steam expansion chamber (3) is supplied with steam by the steam generating device (1). Thus, the containment wall (4) moved by the steam inside the steam expansion chamber (3) can occupy at least one position blocking the one or more outlet opening(s) (6).

Figure 8:
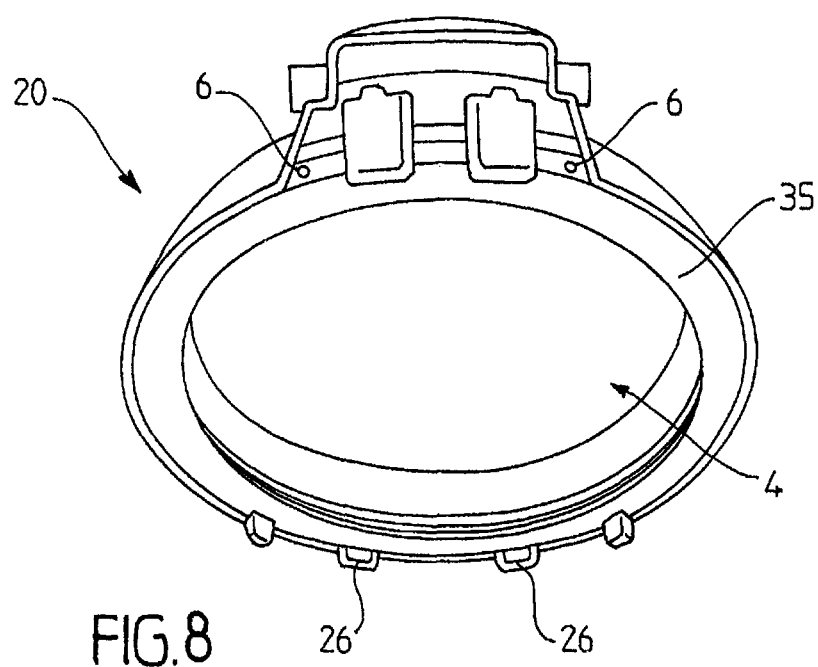
FIG. 8 is a back perspective partial view of the appliance illustrated in FIG. 1, showing air outlet openings.

In the example of implementation illustrated in the figures, the one or more outlet opening(s) (6) are arranged in the airtight ring (35). FIG. 8 shows two outlet openings (6) arranged in the airtight ring (35) at the place where the lid (20) is attached.

FIG. 10 shows an outlet opening (6) leading to the exterior of the appliance. In the configuration in FIG. 11, the containment wall (4) extends into the container (40) and blocks the one or more inlet opening(s) (5), as well as the one or more outlet opening(s) (6) (not visible in FIG. 11). The slotted rack (50) is not depicted in FIGS. 10 and 11, but can be placed inside the container (40) if desired.

The appliance comprises a control means (7) to operate the production of steam by the steam generating device (1) according to the steam pressure inside the steam expansion chamber (3).

In the example of implementation illustrated in the figures, the control means (7) comprises a low pressure switch measuring the pressure inside the steam expansion chamber (3). The pressure switch is coupled with a contactor to control the supply of electricity to the heating element (31). The pressure switch has a high threshold, such as 4 mbar, and a low threshold, such as 2.5 mbar. As long as the pressure inside the steam expansion chamber (3) remains lower than the high threshold, the heating element (31) is receiving electrical power. If the pressure inside the steam expansion chamber (3) exceeds the high threshold, the electrical power supplied to the heating element (31) is switched off. The electrical power supplied to the heating element (31) remains switched off as long as the pressure inside the steam expansion chamber (3) remains greater than the low threshold. If the pressure inside the steam expansion chamber (3) falls back below the low threshold, the heating element (31) begins once again to receive electrical power.

As a variation, the control means (7) may comprise, in particular, a temperature sensor arranged to measure the temperature inside the steam expansion chamber (3), in order to control the electrical power supplied to the heating element (31) and/or to control a solenoid valve to regulate the pressure inside the steam expansion chamber (3).

A safety valve (8) may be provided to connect the steam expansion chamber (3) with the exterior in the event of excess pressure. In the example of implementation illustrated in the figures, the safety valve (8) is assembled on the lid (20).

The appliance described in the invention operates and is used in the following manner:

The user opens the lid (20) to fill the water tank (30) and places the food inside the enclosure (2). The user may place the food in the container (40) in place inside the enclosure (2). The user may also place the container (40) containing the food, inside the enclosure (2). If desired, the user may place the food on the slotted rack (50) arranged inside the container (40).

After closing the enclosure (2) by lowering the lid (20), the user can start the appliance. The heating element (31) is then supplied with electrical power. The steam generating device (1) begins to produce steam, which moves into the steam expansion chamber (3), on the one hand, and into the enclosure (2) through the one or more inlet opening(s) (5). The steam gradually fills the steam expansion chamber (3). The steam present inside the steam expansion chamber (3) tends to deform the containment wall (4) toward the enclosure (2). The steam let into the enclosure (2) through the one or more inlet opening(s) (5) tends to push out the air present inside the enclosure (2) through the one or more outlet opening(s) (6), as shown in FIG. 10. The containment wall (4) deformed toward the enclosure (2) first blocks the one or more outlet opening(s) (6) upon reaching the airtight ring (35). The containment wall (4) deformed toward the enclosure (2) then blocks the one or more inlet opening(s) (5), upon reaching the upper portion of the container (40). The containment wall (4) deformed toward the enclosure (2) comes to envelop the upper part of the food placed inside the enclosure (2), which improves the transfer of heat between the containment wall (4) heated by the steam present inside the steam expansion chamber (3) and the food present inside the enclosure (2). As long as the pressure inside the steam expansion chamber (3) remains below the high threshold, the heating element (31) remains electrically powered. This phase of operation is a preheating phase, or a temperature increase phase. When the pressure inside the steam expansion chamber (3) exceeds the high threshold, the electrical power to the heating element (31) is cut off until the pressure inside the steam expansion chamber (3) once again falls below the low threshold, and then is reestablished until the pressure inside the steam expansion chamber (3) once again rises above the high threshold, and so on. This other phase of operation is a heating and/or cooking phase, or a regulation phase, using the pressure inside the steam expansion chamber (3) to control the supply of electricity to the heating element (31). Controlling the steam pressure inside the steam expansion chamber (3) makes it possible to avoid exerting too much pressure on the food. When the slotted rack (50) is used, the cooking juice can be collected in the juice collection area (45) of the container (40). Once the desired food cooking and/or heating time has been reached, the electrical supply to the heating element (31) is switched off. This switching off can be done manually by the user or automatically by a timer or cooking program. The user can then open the enclosure (2) to remove the heated and/or cooked food. If desired, the user can take hold of the container (40) by the handles (41) extending to the exterior of the appliance, and remove it from the appliance, to bring it to the dining table.

As a variation, the containment wall (4) is not necessarily made entirely of an elastically deformable, flexible material. The containment wall (4) may be at least partially made of an elastically deformable, flexible material. In particular, the containment wall (4) may comprise at least one rigid part, and/or several parts or portions of differing rigidity.

As a variation, the containment wall (4) does not necessarily have a resting position that is concave with respect to the enclosure (2). In particular, the containment wall (4) may have a resting position that is at least partially concave with respect to the enclosure (2). The containment wall (4) may also come into contact with the food present inside the enclosure (2) before the steam is let into the steam expansion chamber (3).

As a variation, the juice collection area (45) of the container (40) is not necessarily annular.

Alternatively, the container (40) is not necessarily detachable from a main body (10).

As a variation, the steam generating device (1) does not necessarily comprise a heating element (31) arranged in the bottom of a water tank (30). In particular, the steam generating device (1) may comprise a tubular or non-tubular boiler, supplied by a water tank, if desired by means of a pump, the boiler comprising or being combined with a heating element.

As a variation, the steam generating device (1) is not necessarily arranged in the main body (10). In particular, the steam generating device (1) may be arranged in the lid (20).

As a variation, the container (40) is not necessarily heated by the steam generating device (1). In particular, the steam generating device (1) is not necessarily arranged underneath the container (40). The steam generating device (1) may, for example, be arranged in the main body (10) laterally with respect to the enclosure (2).

Thus preferably, the container (40) is heated by an electric heating device that is independent of the steam generating device (1). In particular, the electric heating device may comprise an electric heating element arranged beneath the container (40). The electric heating element may, for example, be brought back beneath the container (40) or be part of an electric heating plate holding the removable container (40).

As a variation, the containment wall (4) is not necessarily pressed onto the food only by the steam let into the steam expansion chamber (3). In particular, the containment wall (4) can be pressed onto the food placed inside the container (40) at least in part by a pump (70) used to inject air into the steam expansion chamber (3), and/or to suck out the air present inside the enclosure (2). These arrangements also make it possible to avoid the condensation phenomena occurring in the steam expansion chamber (3) and press the containment wall (4) onto the food in the container (40) more effectively. In particular, the pump (70) can be arranged in the main body (10) or be held by the lid (20).

Alternatively, the one or more inlet opening(s) (5) are not necessarily positioned inside the container (40). The one or more inlet opening(s) (5) may in particular be positioned between the container (40) and the lid (20), or inside the lid (20). Alternatively, the enclosure (2) does not necessarily comprise an inlet opening (5).

Alternatively, the lid (20) is not necessarily rotatably mounted on the main body (10) along a horizontal axis. The lid (20) may in particular be arranged on the main body (10), in particular when the steam generating device (1) is arranged inside the lid (20).

This invention is in no way limited to the example of implementation described and its variations, but encompasses many modifications within the scope of the claims.

The invention claimed is:

1. An appliance for cooking and/or heating food comprising an enclosure comprising a container, a lid and a steam generating device, wherein the lid has a steam expansion chamber that is supplied with steam by the steam generating device, the steam expansion chamber comprises a containment wall to delimit one portion of the enclosure, wherein the containment wall is mobile with respect to the container and the lid when the enclosure is closed with the lid, and wherein the containment wall is adapted to be moved by one of (a) steam present inside the steam expansion chamber and (b) a pump adapted to inject air into the steam expansion chamber or suck the air present inside the enclosure.

2. The appliance as described in claim 1, wherein the containment wall is at least partially made of a flexible, elastically deformable material.

3. The appliance as described in claim 2, wherein the containment wall has a resting position that is at least partially set inside the lid.

4. The appliance as described in claim 1, wherein the container has a removable slotted rack and has a juice collection area arranged beneath a slotted part of the slotted rack.

5. The appliance as described in claim 1, wherein the lid has an airtight ring supported by an upper rim of the container.

6. The appliance as described in claim 1, wherein the container is held by a main body.

7. The appliance as described in claim 6, wherein the container is removable from the main body.

8. The appliance as described in claim 6, wherein the lid is mounted so as to be mobile with respect to the main body between a raised position for introducing the food into the container or removing the food from the container and a lowered position for the cooking and/or heating of the food placed inside the container.

9. The appliance as described in claim 6, wherein the steam generating device is contained within the main body.

10. The appliance as described in claim 1, wherein the steam generating device comprises a water tank associated with a heating element.

11. The appliance as described in claim 10, wherein a bottom of the container has a raised portion extending above the heating element.

12. The appliance as described in claim 4, wherein the slotted rack incorporates a non-slotted portion arranged above a heating element.

13. The appliance as described in claim 1, wherein the enclosure comprises one or more inlet openings leading from the steam generating device for injecting steam into the enclosure.

14. The appliance as described in claim 13, wherein the one or more inlet openings are arranged in the container.

15. The appliance as described in claim 13, wherein, when the containment wall is moved by the steam present inside the steam expansion chamber, the containment wall occupies at least one position blocking the one or more inlet openings.

16. The appliance as described in claim 1, wherein the enclosure comprises one or more outlet openings leading to an exterior of the appliance.

17. The appliance as described in claim 16, wherein one or more outlet openings are positioned in an airtight ring.

18. The appliance as described in claim 16, wherein, when the containment wall is moved by the steam present inside the steam expansion chamber, the containment wall occupies at least one position blocking the one or more outlet openings.

19. The appliance as described in claim 1, further comprising a control means to operate production of the steam by the steam generating device according to a pressure inside the steam expansion chamber.

\* \* \* \* \*